US 7,793,315 B2

(12) United States Patent
Asakura et al.

(10) Patent No.: US 7,793,315 B2
(45) Date of Patent: Sep. 7, 2010

(54) PHOTOSENSITIVE-RECORDING MEDIUM CARTRIDGE, AND SHUTTER LOCK CANCELING MECHANISM

(75) Inventors: Katsuyoshi Asakura, Kanagawa (JP); Tomoyuki Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 713 days.

(21) Appl. No.: 11/711,102

(22) Filed: Feb. 27, 2007

(65) Prior Publication Data
US 2007/0204284 A1 Aug. 30, 2007

(30) Foreign Application Priority Data
Feb. 27, 2006 (JP) ............... 2006-050673

(51) Int. Cl.
*G11B 23/03* (2006.01)
(52) U.S. Cl. .................................... 720/740
(58) Field of Classification Search ............ 720/740, 720/730, 742, 741, 632, 727, 729, 739, 738; 360/133
See application file for complete search history.

(56) References Cited

U.S. PATENT DOCUMENTS

| 5,260,925 | A  | * | 11/1993 | Camps et al. | 720/624 |
| 6,714,507 | B2 | * | 3/2004  | Kato         | 720/624 |
| 7,159,229 | B2 | * | 1/2007  | Inoue et al. | 720/728 |
| 7,555,765 | B2 | * | 6/2009  | Kobayashi    | 720/739 |
| 2004/0255319 | A1 | * | 12/2004 | Inoue et al. | 720/741 |
| 2005/0028187 | A1 | * | 2/2005  | Park et al.  | 720/740 |
| 2005/0193401 | A1 | * | 9/2005  | Lin et al.   | 720/624 |

FOREIGN PATENT DOCUMENTS

| EP | 0 634 748 A2 | | 1/1995 |
| EP | 0 907 176 A2 | | 4/1999 |
| EP | 1826762 A1 | * | 8/2007 |
| JP | 61-284885 A | | 12/1986 |
| JP | 08-55456 A | | 2/1996 |
| JP | 2001-216754 A | | 8/2001 |
| WO | WO 2006/093308 A1 | | 9/2006 |

OTHER PUBLICATIONS

European Search Report dated Jun. 19, 2007.

* cited by examiner

*Primary Examiner*—Allen T Cao
(74) *Attorney, Agent, or Firm*—Sughrue Mion, PLLC

(57) ABSTRACT

A photosensitive-recording medium cartridge includes: a photosensitive recording medium; a cartridge body including: a disk housing portion; an internal opening; and a shutter sliding face; a shutter; and a locking mechanism having a locking member, wherein the cartridge body includes a positioning groove including: a shallow groove formed in a side face thereof in the opposite direction of a loading direction of the photosensitive-recording medium cartridge; and a deep groove which is formed deeper in the shallow groove, and the locking mechanism includes a lock canceling member having an operating portion which protrudes from the positioning groove, and pushes the operating portion into the cartridge body to allow cancellation of engagement between the locking member and the shutter.

3 Claims, 12 Drawing Sheets

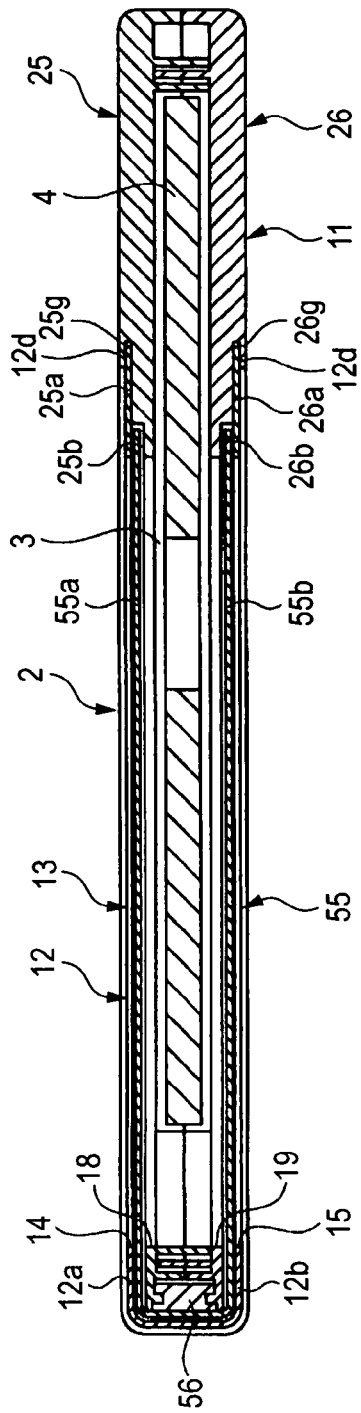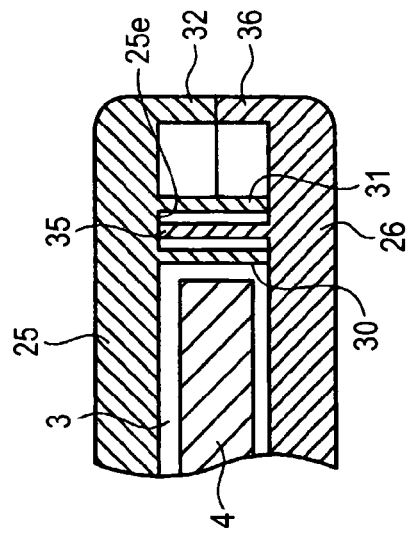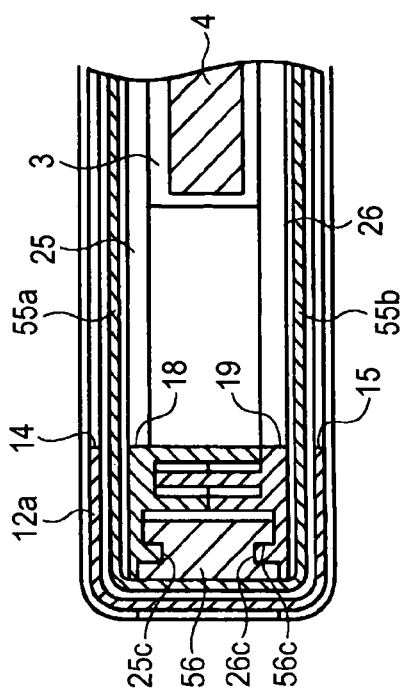

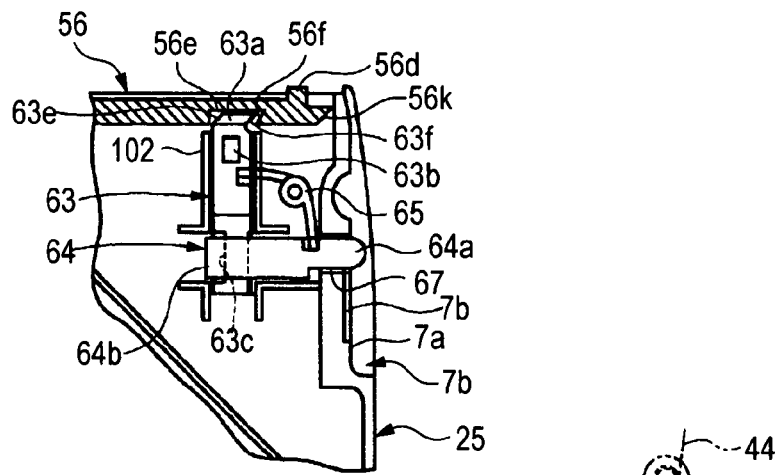
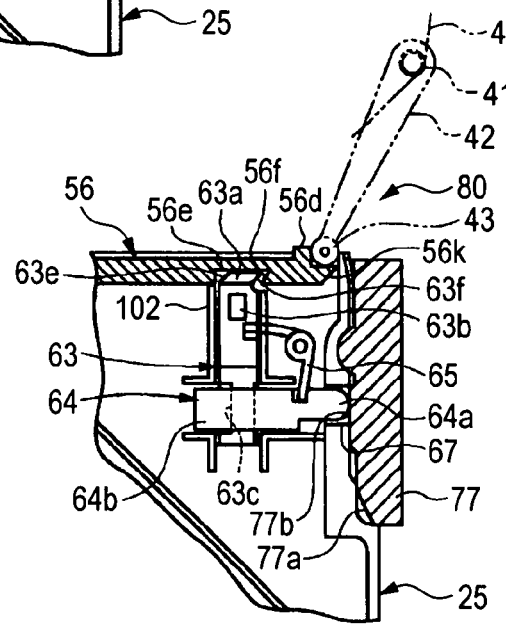
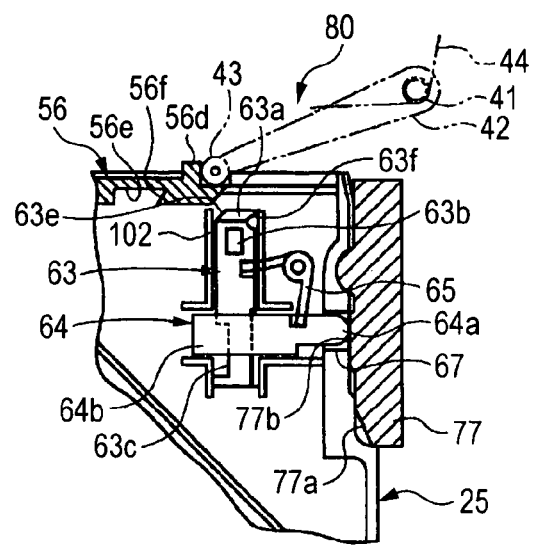
FIG. 11A
FIG. 11B
FIG. 11C

PHOTOSENSITIVE-RECORDING MEDIUM CARTRIDGE, AND SHUTTER LOCK CANCELING MECHANISM

BACKGROUND OF THE INVENTION

1. Field of the Invention

The present invention relates to a photosensitive-recording medium cartridge, and a shutter lock canceling mechanism, and more particularly to a photosensitive-recording medium cartridge, and shutter lock canceling mechanism in which a shutter of a photosensitive recording medium is locked, and, when a photosensitive recording medium is loaded into a recording and reproducing apparatus, cancellation of engagement of a locking mechanism of the shutter can be surely allowed.

2. Background Art

A hologram recording medium on which data are recorded by hologram has been developed. The hologram recording medium is a photosensitive recording medium in which a hologram recording layer made of a photosensitive material is laminated on a disk-like support member, and data are recorded in multilayers in the form of interference fringes of a laser beam, so that it is possible to obtain a data recording capacity which is larger than that of a DVD that is widely used in a conventional art. In the hologram recording medium, when the hologram recording layer is exposed to light or a dust adheres to the layer, the performance is adversely affected. Therefore, the hologram recording medium is handled while being housed in a cartridge having light shielding and dust proof functions.

As a cartridge for housing a hologram recording medium, a cartridge is known that includes: a cartridge body in which an opening for exposing the hologram recording medium to the outside; a shutter which opens and closes the opening; and a light-shielding plate disposed outside the shutter (for example, see JP-A-2001-216754 (the term "JP-A" as used herein means an "unexamined published Japanese patent application")). When the cartridge is inserted into a recording and reproducing apparatus which writes data on or reads data from the hologram recording layer, the shutter is opened by the function of a shutter opening member disposed in the recording and reproducing apparatus.

When the shutter is accidentally opened, there is the possibility that the hologram recording medium is exposed to light and cannot be used. Therefore, also a cartridge is known in which a locking mechanism including an elastic piece extending from a shutter and having an engaging claw at the tip end is disposed, and the engaging claw is engaged with a first or second engaging recess formed in an outer case, thereby holding the shutter at a closing or opening position (for example, see JP-A-8-055456).

The cartridge disclosed in Patent Reference 1 includes the shutter for light shielding and dust proof, but fails to include a shutter locking mechanism which blocks the opening of the shutter. In the cartridge, therefore, there is the possibility that the shutter is accidentally opened.

The disk cartridge disclosed in Patent Reference 2 includes the shutter locking mechanism configured by the first or second engaging recess formed in the outer case, and the engaging claw. The shutter is held at the closing or opening position. However, the engagement between the first or second engaging recess and the engaging claw is easily canceled simply by pressing the elastic piece having the engaging claw. Therefore, it is requested to develop a highly-reliable shutter locking mechanism in which a locking state can be maintained more surely.

As such a highly-reliable shutter locking mechanism, it may be contemplated to employ a shutter locking mechanism in which the locking mechanism is set to a cancellation-enabled state by a first operation, and a locking state is canceled by a second operation, so that the lock cancellation requires a two-step operation. From the viewpoint of improving the operability, it is preferable to automatically perform the first operation of setting the locking mechanism to the cancellation-enabled state, when a cartridge is loaded into a recording and reproducing apparatus. However, the relative position between the cartridge loaded into the recording and reproducing apparatus and the recording and reproducing apparatus is hardly maintained constant under the influences due to the gap between the cartridge and a cartridge housing portion of the recording and reproducing apparatus, component tolerances, and the like. In the case where a lock canceling mechanism disposed on the side of the cartridge is caused to operate by a shutter opening member disposed on the side of the recording and reproducing apparatus, therefore, there is the possibility that the lock cancellation is incompletely performed and the subsequent shutter opening cannot be conducted.

The invention has been conducted in view of the above-discussed circumstances. It is an object of the invention to provide a photosensitive-recording medium cartridge and shutter lock canceling mechanism which include a shutter locking mechanism that, when locking of a shutter is to be cancelled, requires a two-step operation of a first operation of setting the locking mechanism to a cancellation-enabled state, and a second operation of then canceling the locking, whereby cancellation of engagement of the locking mechanism by the first operation can be surely allowed.

SUMMARY OF THE INVENTION

The object of the invention is attained by the photosensitive-recording medium cartridge and shutter lock canceling mechanism which will be described.

(1) According to an aspect of the invention, a photosensitive-recording medium cartridge includes: a photosensitive recording medium; a cartridge body including: a disk housing portion which rotatably storages the photosensitive recording medium; an internal opening through which a center and recording face of the photosensitive recording medium are exposed to an outside; and a shutter sliding face which is formed on an outer face while being inward offset; a shutter which is movable between a closing position where the internal opening is closed, and an opening position where the internal opening is opened, and which is disposed on the shutter sliding face; and a locking mechanism having a locking member which is to be engaged with the shutter to lock the shutter at the closing position, wherein the cartridge body includes a positioning groove including: a shallow groove formed in a side face thereof in the opposite direction of a loading direction of the photosensitive-recording medium cartridge; and a deep groove which is formed deeper in the shallow groove, and, the locking mechanism includes a lock canceling member having an operating portion which protrudes from the positioning groove, and pushes the operating portion into the cartridge body to allow cancellation of engagement between the locking member and the shutter.

In the thus configured photosensitive-recording medium cartridge, the locking mechanism includes the lock canceling member having the operating portion. The operating portion is protrudingly disposed in the positioning groove consisting of: the shallow groove formed in the side face of the cartridge body from the front side in the loading direction of the cartridge toward the rear side; and the deep groove. A shutter opening member which is disposed in a recording and reproducing apparatus that will be described later, and which is to be fitted into the positioning groove is first fitted into the positioning groove to push the operating portion by only one step into the cartridge body, and then fitted into the deep groove to further push the operating portion into the cartridge body. Therefore, the cancel stroke of the lock canceling member can be enlarged, and the lock canceling member can be pushed into the cartridge body by the two-step operation, and hence cancellation of the engagement between the locking member and the shutter can be surely allowed without being affected by the loading position of the cartridge into the recording and reproducing apparatus, or dispersion of the component dimensions. Accordingly, an operation of opening the shutter can be surely performed, and the reliability of the operation of opening the shutter is improved.

(2) The photosensitive-recording medium cartridge as described in the item (1), wherein the shutter includes a slide member including a recess, and the locking member has a locking piece at one end thereof, the locking member being engaged with the recess, and each of the shutter and locking member having a shape inclined in an opposite direction of a opening direction of the shutter.

(3) A shutter lock canceling mechanism that is to be disposed in a recording and reproducing apparatus into which a photosensitive-recording medium cartridge according to claim 1 is to be loaded, and which records data on the photosensitive recording medium, or reproduces recorded data from the medium, wherein the shutter lock canceling mechanism includes a shutter opening member which includes a ridge and which is to be fitted into the positioning groove, the ridge being fitted into the deep groove to push the operating portion into the cartridge body when the photosensitive recording medium is loaded into the recording and reproducing apparatus.

In the thus configured shutter lock canceling mechanism, the shutter opening member which is disposed in the recording and reproducing apparatus, and which is to be fitted into the positioning groove formed in the side face of the cartridge body includes the ridge that is to be fitted into the deep groove to further push the operating portion into the cartridge body. Therefore, the cancel stroke of the lock canceling member disposed on the photosensitive-recording medium cartridge can be enlarged, and hence cancellation of the engagement between the locking member and the shutter can be surely allowed without being affected by the loading position of the cartridge into the recording and reproducing apparatus, or dispersion of the component dimensions. Furthermore, cancellation of the engagement between the locking member and the shutter can be surely allowed simply by loading the photosensitive-recording medium cartridge into the recording and reproducing apparatus. Therefore, the handleability of the photosensitive-recording medium cartridge can be remarkably increased.

(4) The shutter lock canceling mechanism as described in the item (3), which includes a shutter opening mechanism including a shutter opening member, wherein the photosensitive-recording medium cartridge includes a slide member including a engaging groove having width, which narrows in a direction perpendicular to a width direction thereof, and the shutter opening member engages the engaging groove.

According to the invention, it is possible to provide a photosensitive-recording medium cartridge and shutter lock canceling mechanism which includes a shutter locking mechanism that, when locking of a shutter is to be cancelled, requires a two-step operation of a first operation of setting the locking mechanism to a cancellation-enabled state, and a second operation of then canceling the locking of the shutter, and in which the first operation is automatically performed by loading the cartridge into the recording and reproducing apparatus, so that it is possible to set a state where cancellation of engagement of the locking mechanism can be surely performed.

BRIEF DESCRIPTION OF THE DRAWINGS

The invention disclosed herein will be understood better with reference to the following drawings of which:

FIG. 4A is a section view taken along the line IV-IV in FIG. 1 and showing the whole of the cartridge, FIG. 4B is a similar enlarged section view of a peripheral portion of the front end, FIG. 4C is a similar enlarged section view of a peripheral portion of the rear end;

FIGS. 11A to 11C are views illustrating the operation of the locking mechanism;

DETAILED DESCRIPTION OF THE INVENTION

Figure 1:
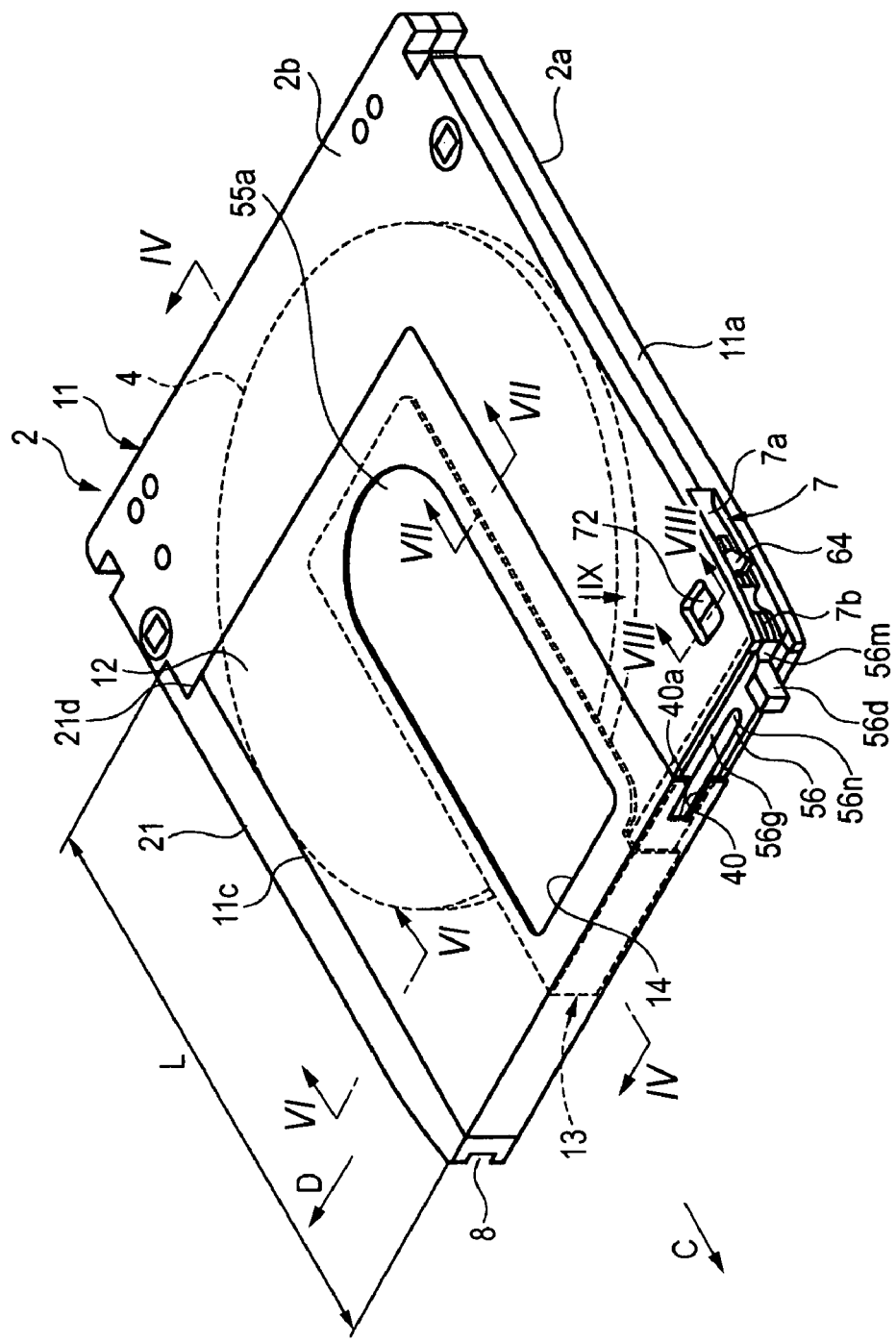
FIG. 1 is a perspective view showing an external shape of a cartridge to which the invention is applied.
Figure 5:
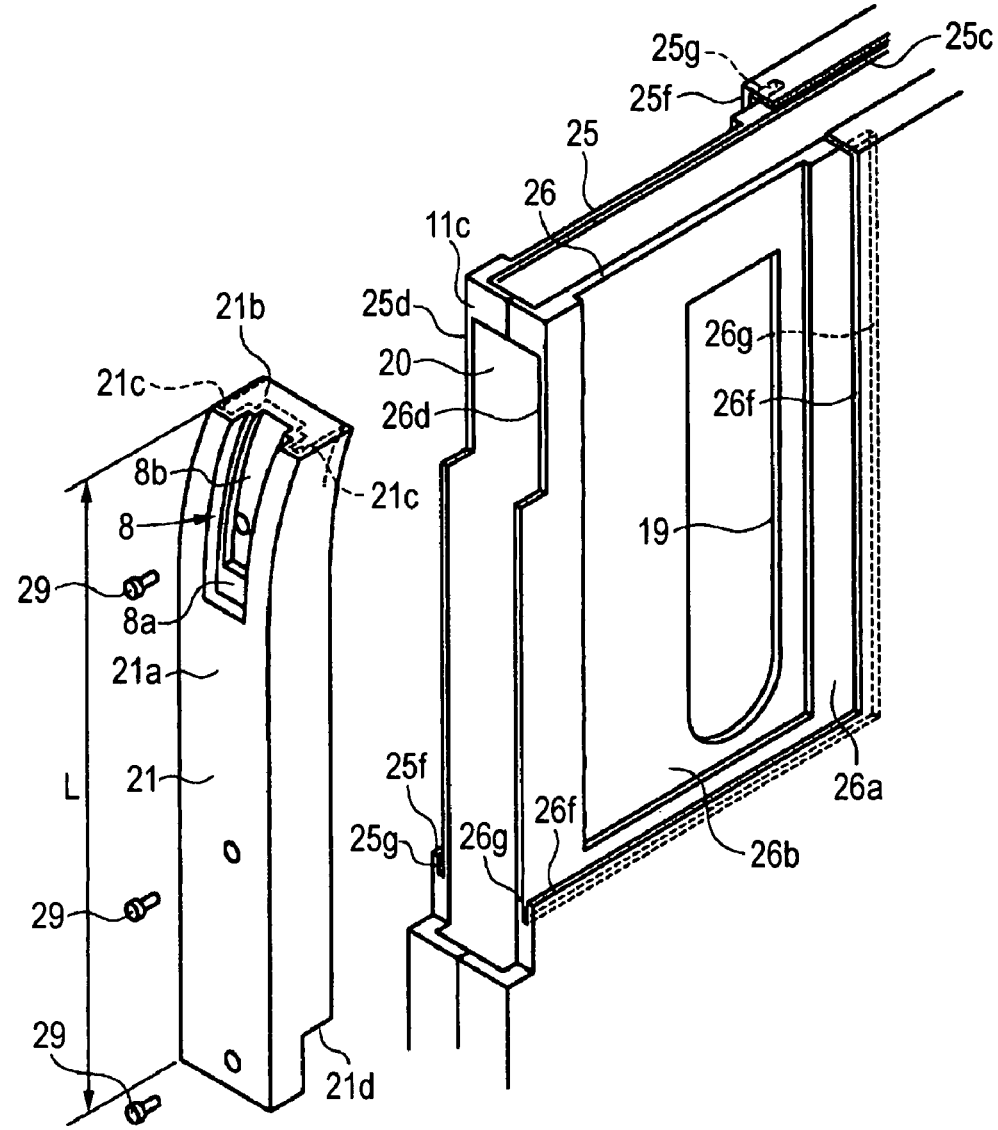
FIG. 5 is an expanded exploded perspective view of main portions of the cartridge in which a shutter and a light-shielding plate are removed away.
Figure 6:
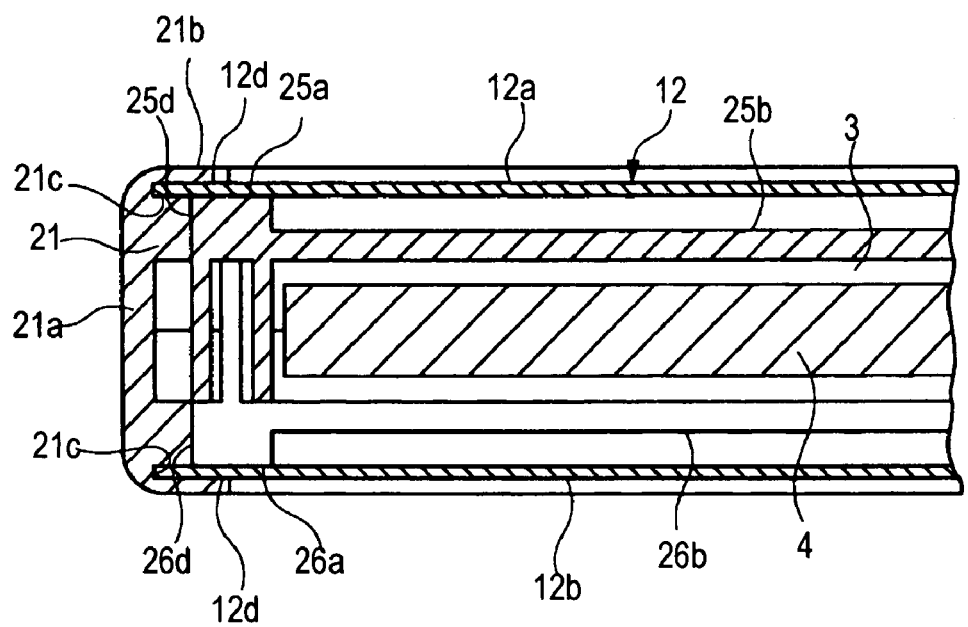
FIG. 6 is a section view taken along the line VI-VI in FIG. 1.
Figure 7:
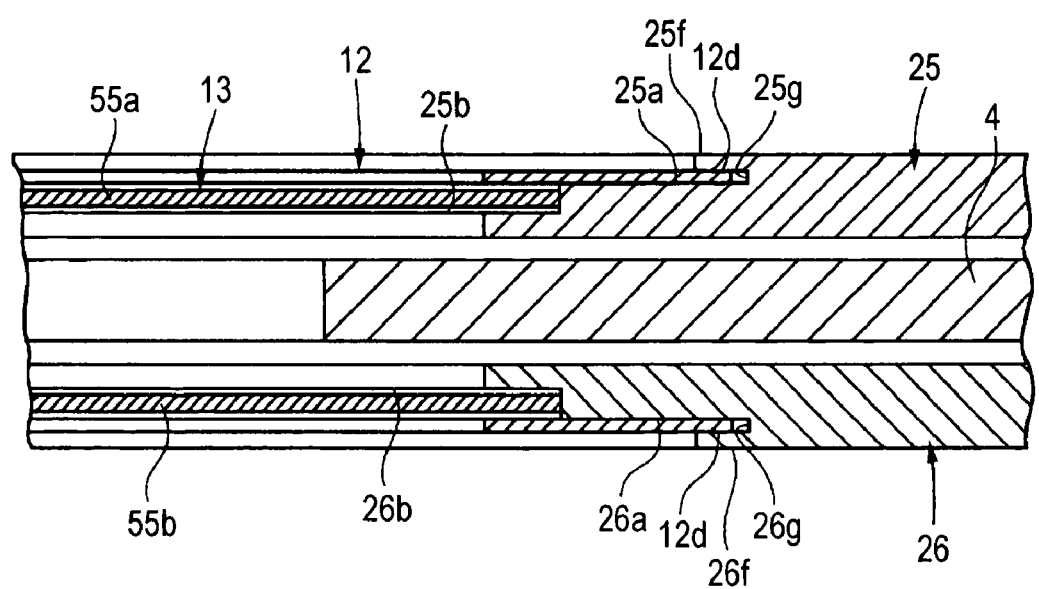
FIG. 7 is a section view taken along the line VII-VII in FIG. 1.

Hereinafter, an embodiment of the invention will be described in detail with reference to the accompanying drawings. FIG. 1 is a perspective view of a hologram-recording medium cartridge (hereinafter, referred to simply as cartridge) which is the embodiment of the invention, FIG. 2 is a perspective view showing the opposite face of the cartridge, FIG. 3 is an exploded perspective view showing the configuration of the cartridge, FIG. 4A is a section view taken along the line IV-IV in FIG. 1 and showing the whole of the cartridge, FIG. 4B is a similar enlarged section view of a peripheral portion of the front end, FIG. 4C is a similar enlarged section view of a peripheral portion of the rear end, FIG. 5 is an expanded exploded perspective view of main portions of the cartridge in which a shutter and a light-shielding plate are removed away, FIG. 6 is a section view taken along the line VI-VI in FIG. 1, and FIG. 7 is a section view taken along the line VII-VII in FIG. 1.

Figure 2:
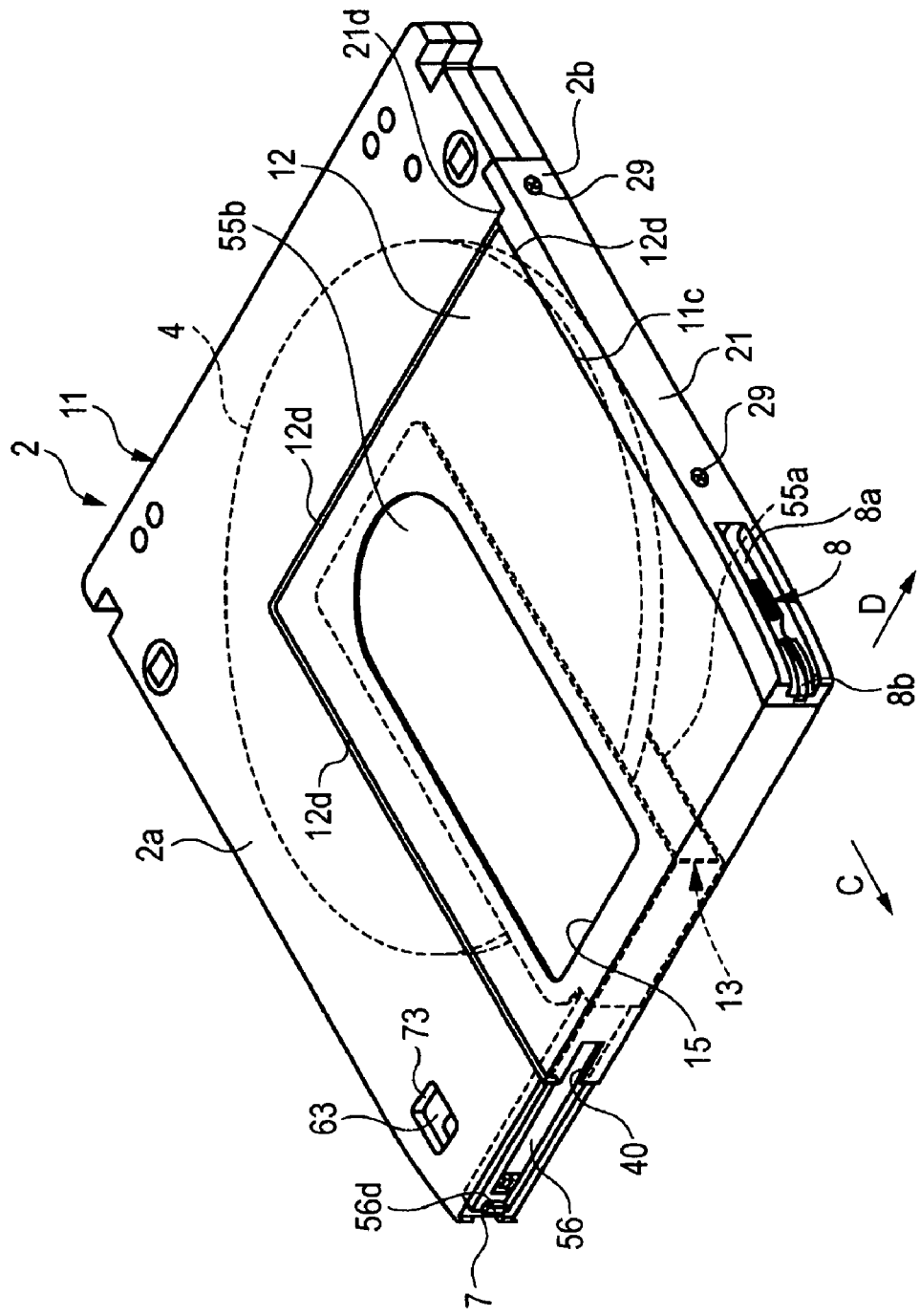
FIG. 2 is a perspective view showing the opposite face of the cartridge.
Figure 3:
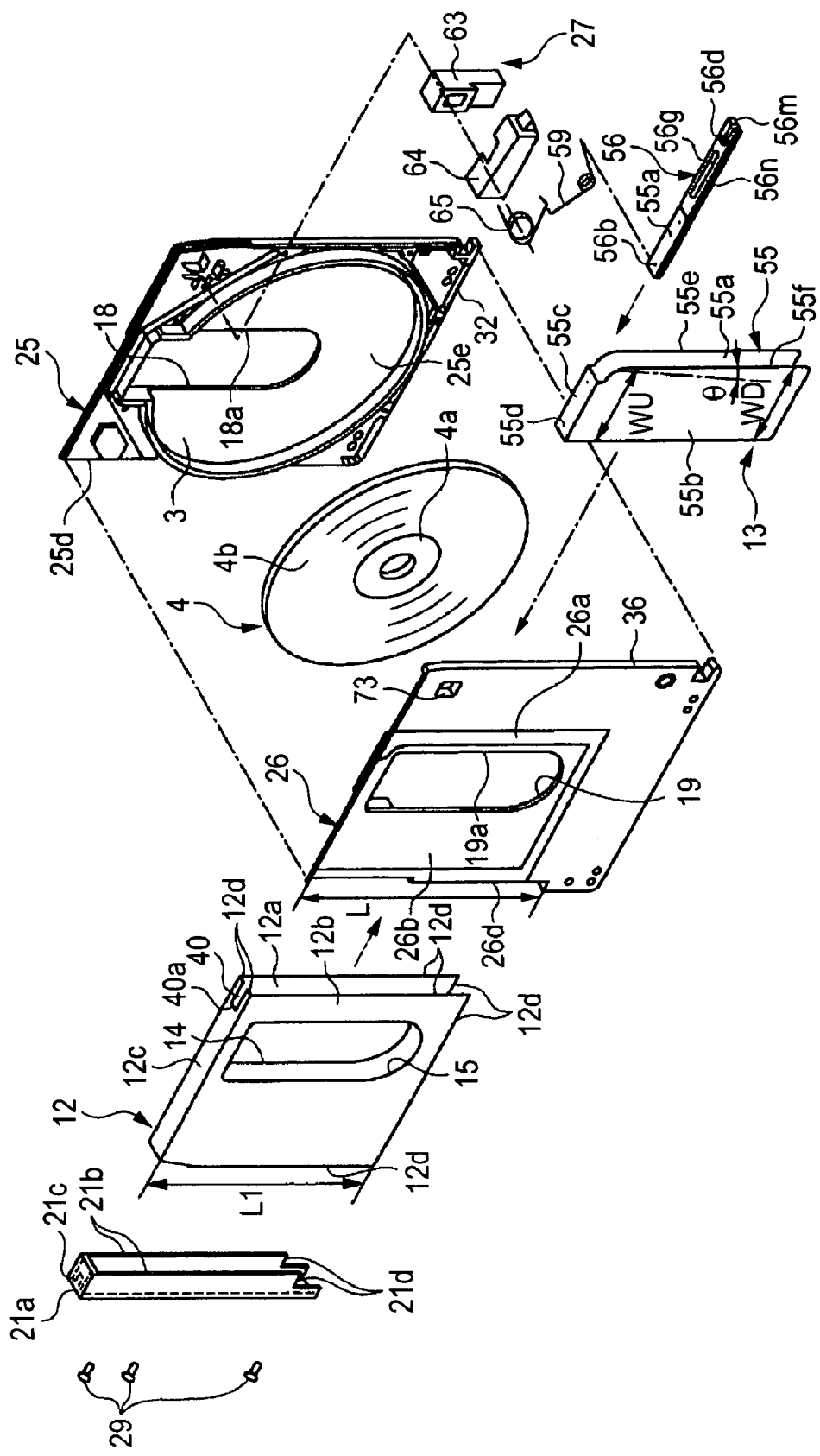
FIG. 3 is an exploded perspective view showing the configuration of the cartridge.

As shown in FIGS. 1 to 3, the cartridge 2 is loaded in the direction of the arrow C into a hologram recording apparatus or the like which is to handle the cartridge. In the both side faces of the tip end portion in the loading direction of the cartridge 2, formed are positioning grooves 7, 8 into which, when the cartridge 2 is loaded into a hologram recording apparatus or the like, positioning members disposed in the apparatus are inserted.

A photosensitive recording medium (hereinafter, referred to as recording disk) 4 that is rotatably housed is a disk housing portion 3 of the cartridge 2 is a hologram recording disk which is formed into a disk-like shape having a hole at the center, and in which a hologram recording layer is formed on the both faces. In each of the hologram recording layers, data are recorded in multilayers in the form of interference fringes of a laser beam of a wavelength band of, for example, 532 nm of green to 405 nm of blue. Alternatively, a reinforcing member may be added to a hole portion of the recording disk 4. In order to perform recording on the both recording faces of the recording disk 4, the cartridge 2 is loaded into the hologram recording apparatus while either of an A-face 2a or a B-face 2b is upward directed.

The cartridge 2 includes: a cartridge body 11 in which a disk housing portion 3 is disposed; a lid 21 which closes an opening 20 formed in a side face 11c of the cartridge body 11; a light-shielding plate 12 which is attached so as to interpose the outside of the cartridge body 11; and a shutter 13 which is incorporated between the cartridge body 11 and the light-shielding plate 12. Approximately rectangular external openings 14, 15 which are second openings are formed in the upper and lower faces of the light-shielding plate 12, respectively. When the shutter 13 is at the closing position, the external openings 14, 15 are closed by first and second shutters 55a, 55b, respectively.

When the shutter 13 is moved toward an opening position or in the direction of the arrow D, the external openings 14, 15, and internal openings 18, 19 which are disposed in the cartridge body 11 so as to oppose to the external openings 14, 15, and which have the same shape are opened. As a result, a center portion 4a and recording face 4b of the recording disk 4 housed in the disk housing portion 3 are exposed to the outside.

The shutter 13 is urged to the closing position by an incorporated shutter spring, and locked at the closing position by a locking mechanism 27. The locking mechanism 27 is cancelled in the following manner. A lock canceling member 64 which is protruded into the positioning groove 7 is pushed into the cartridge 2, thereby causing a locking member 63 which, in this state, is exposed from openings 73, 72 of the A- and B-faces 2a, 2b of the cartridge 2, to slide toward the side of the rear end in the cartridge loading direction. In this way, the shutter 13 is locked to the closing position by the locking mechanism 27 which is cancelled only after the two-step operation is performed. Therefore, the shutter 13 is not accidentally opened.

As shown in FIG. 3, the cartridge body 11 is configured by an approximately plate-like first shell 25, a second shell 26 which is joined to the first shell 25, and a locking mechanism 27 which is incorporated between the first shell 25 and the second shell 26, and which locks the shutter 13.

The first and second shells 25, 26 are formed by injection molding with using, for example, thermoplastic plastics to which a light-shielding material and a lubricant are added, and which are identical or similar to each other. As shown in FIG. 4C which is an enlarged section view of a peripheral portion of the rear end of the cartridge 2, a first light-shielding wall 30 which is a ridge formed with a diameter that is larger than the outer diameter of the recording disk 4, a second light-shielding wall 31 which is disposed outside the first light-shielding wall 30, and a ridge 32 which is formed in peripheral portions of the three sides excluding a side face 25d are disposed on the inner face of the first shell 25. The internal opening 18 through which the center portion 4a and recording face 4b of the recording disk 4 are exposed to the outside is disposed inside the first light-shielding wall 30.

A third light-shielding wall 35 which is a ridge formed with a diameter that is larger than the outer diameter of the recording disk 4, and which is inserted between the first and second light-shielding walls 30, 31 of the first shell 25, and a ridge 36 which is formed in peripheral portions of the three sides excluding a side face 26d are disposed on the inner face of the second shell 26. The internal opening 19 through which the center portion 4a and recording face 4b of the recording disk 4 are exposed to the outside is disposed inside the third light-shielding wall 35.

When the recording disk 4 is placed inside the third light-shielding wall 35 of the second shell 26, and the first shell 25 is overlaid on the upper face of the second shell 26, the third light-shielding wall 35 is inserted between the first and second light-shielding walls 30, 31, and the tip end of the third light-shielding wall 35 butts against the inner face 25e of the first shell 25. The disk housing portion 3 is formed by the light-shielding walls 30, 31, 35 and the inner faces of the first and second shells 25, 26.

The side wall of the disk housing portion 3 has a labyrinth-like light-shielding structure which is formed by interdigitating the three light-shielding walls 30, 31, 35. Even when light or dusts enter through the joint portion of the first and second shells 25, 26, therefore, they do not enter the interior of the disk housing portion 3. Since the first and second shells 25, 26 are firmly fixed together by screwing, a gap is not formed in the joint portion of the shells. Alternatively, the tip end of the third light-shielding wall 35 may be welded to the inner face 25e of the first shell 25 by ultrasonic welding or the like. In the alternative, the light-shielding property is further improved.

When the first and second shells 25, 26 are overlaid and joined to each other, the opening 20 which is opened to the outside is formed in the side face 11c formed by the side faces 25d, 26d where the ridges 32, 36 are not disposed (see FIG. 5). The length L of the opening 20 is larger than the length L1 of a peripheral edge portion 12d of the light-shielding plate 12 which is positioned on the side of the opening 20.

As shown in FIGS. 3 to 7, light-shielding plate attaching faces 25a, 26a which are slightly larger than the shape of the light-shielding plate 12, and which are inward offset by a depth that is equal to or larger than the thickness of the light-shielding plate 12 are formed in the outer faces of the first and second shells 25, 26. Portions of the light-shielding plate attaching faces 25a, 26a on the side of the opening 20 are formed continuously to the side faces 25d, 26d without producing steps. Light-shielding plate housing grooves 25g, 26g are formed in edge portions (including the front edges in the loading direction of the cartridge 2) of the three sides of the light-shielding plate attaching faces 25a, 26a excluding the portions on the side of the opening 20. When the light-shielding plate 12 is attached to the light-shielding plate attaching faces 25a, 26a, the grooves are fitted to the peripheral edge portion 12d of the light-shielding plate 12 to constitute a labyrinth.

As shown in FIGS. 1 to 3, and 5 and 6, the lid 21 is fitted to the opening 20, and screwed thereto by three screws 29 to close the opening 20. The lid 21 is a bottomed box which has a substantially rectangular parallelepiped shape, and the length of which is equal to the length L of the opening 20. A body portion 21a which has a rectangular plate like shape, and a substantially U-like lib 21b which upstands from three sides, or the front edge of the body portion 21a in the loading direction of the cartridge body 11, and the both side faces are integrally formed. A lid groove 21c is formed in the inner side of a joint portion between the lib 21b and the body portion 21a.

A positioning groove 8 which is rearward directed from the front side in the loading direction of the cartridge 2 is formed in the side face of the body portion 21a. The positioning groove 8 is configured by a shallow groove 8a which has a small depth, and a deep groove 8b which is formed deeper in the shallow groove 8a. The lib 21b in the lower portion of the longitudinal direction of the lid 21 is reduced in height so that a step portion 21d is formed. When the lid 21 is attached to the opening 20, the peripheral edge portion 12d of the light-shielding plate 12 is fitted into the lid groove 21c to constitute a labyrinth.

As the material of the light-shielding plate 12, for example, an aluminum alloy which can provide the light shielding property, the corrosion resistance, the ornamentability, and the workability, and which is light and strong is used. Alternatively, the light-shielding plate 12 may be formed by a plastic. In order to ensure the light shielding property and slidability of the shutter 13, a plastic to which a light-shielding material and a lubricant are added may be used.

As shown in FIG. 3, in the light-shielding plate 12, the external openings 14, 15, and a cutaway 40 which provides the shutter 13 with a moving range are formed in a thin plate of an aluminum alloy, and the thin plate is bent so that the section has a substantially U-like shape. As a result, in the light-shielding plate 12, first and second plate portions 12a, 12b which have the external openings 14, 15, respectively, and a third plate portion 12c which has the cutaway 40, and through which the first and second plate portions 12a, 12b are continuous are disposed.

The light-shielding plate 12 is fitted from the side face on the side of the opening 20 to be attached to the light-shielding plate attaching faces 25a, 26a, in such a manner that the B- and A-faces 2b, 2a of the cartridge body 11 are interposed between the first and second plate portions 12a, 12b, and the tip end in the loading direction C of the cartridge body 11 is covered by the third plate portion 12c. The lid 21 is attached to the opening 20 by screwing. The step portion 21d of the lid 21 is incorporated so as to butt against end portions on the side of the opening 20 of ribs 25f, 26f forming the light-shielding plate housing grooves 25g, 26g. Therefore, the edge portions of the light-shielding plate 12 on the side of the opening 20 are surely covered, so that light is prevented from laterally entering.

The peripheral edge portion 12d of the light-shielding plate 12 is fitted into the light-shielding plate housing grooves 25g, 26g and the lid groove 21c to be fixed thereto. Therefore, the opening 20 is closed by the lid 21, and light shielding is surely performed by the labyrinth configured by the peripheral edge portion 12d, the light-shielding plate housing grooves 25g, 26g, and the lid groove 21c. The light-shielding plate 12 is fixed in a state where a gap for allowing the shutter 13 to be slidingly moved is ensured between the light-shielding plate 12 and the outer face of the cartridge body 11 (the first and second shells 25, 26).

The light-shielding plate 12 is incorporated while being fitted from the side face on the side of the opening 20, without opening the U-like shape of the light-shielding plate 12, and hence reduction of the light shielding property due to deformation of the light-shielding plate 12 can be prevented from occurring. Since the light-shielding plate 12 is fixed by fitting the peripheral edge portion 12d thereof into the light-shielding plate housing grooves 25g, 26g and the lid groove 21c, screwing of the light-shielding plate 12 is not necessary. Therefore, the number of components is reduced, and the assembling property is improved.

The opening 20 is covered by the lid 21. Even when a small gap exists between the two shells 25, 26 constituting the cartridge body 11, therefore, the gap is closed by the lid 21, so that an excellent light shielding property is ensured. Since the light-shielding plate attaching faces 25a, 26a are inward offset by a depth that is equal to or larger than the thickness of the light-shielding plate 12, the outer face of the light-shielding plate 12 attached to the cartridge body 11 is not protruded from the surface of the cartridge 2.

As shown in FIG. 3, the shutter 13 is configured by a shutter member 55 which is formed by bending a thin plate having a light shielding property, into a substantially U-like shape, and a thin plate-like slide member 56 which is attached to the shutter member 55. The shutter is urged by the shutter spring 59 in a direction along which the internal openings 18, 19 are closed. The shutter spring 59 is configured by, for example, a torsion coil spring, and the both ends of the spring are engaged with the slide member 56 and the inner face of the first shell 25, respectively.

Because of the same reason as the light-shielding plate 12, the shutter member 55 is formed by, for example, an aluminum alloy. Alternatively, also the shutter member 55 may be formed by a plastic. In order to ensure the light shielding property and the slidability, a plastic to which a light-shielding material and a lubricant are added may be used. The slide member 56 is formed by a plastic to which a light-shielding material and a lubricant are added.

The shutter member 55 includes: the first shutter 55a which is inserted between the outer face of the first shell 25 and the first plate portion 12a of the light-shielding plate 12; the second shutter 55b which is inserted between the outer face of the second shell 26 and the second plate portion 12b of the light-shielding plate 12; and a connecting portion 55c through which the first and second shutters 55a, 55b are continuous to each other, and to which the slide member 56 is attached.

The widths of the first and second shutters 55a, 55b are set so that the lower width WD is larger than the upper width WU. Therefore, edge portions 55e, 55f in the shutter closing direction of the first and second shutters 55a, 55b are inclined by an angle θ with respect to the vertical line of the connecting portion 55c. On the other hand, peripheral edge portions 18a, 19a in the shutter closing direction of the internal openings 18, 19 of the first and second shells 25, 26 are formed without being inclined.

According to the configuration, when the shutter 13 is moved in the closing direction, the edge portions 55e, 55f in the shutter closing direction of the shutter 13, and the peripheral edge portions 18a, 19a in the shutter closing direction of the internal openings 18, 19 intersect always at one point. In accordance with the closing operation of the shutter 13, the point of intersection moves from one-end sides of the edge portions 55e, 55f to the other end sides while being guided by the peripheral edge portions 18a, 19a. Namely, a phenomenon which may possibly occur when the edge portions 55e, 55f of the shutter 13, and the peripheral edge portions 18a, 19a of the internal openings 18, 19 are formed in parallel, and in which, when the shutter 13 is to be closed, the edge portions 55e, 55f butt against the peripheral edge portions 18a, 19a to impede the movement of the shutter 13 is prevented from occurring. Therefore, the shutter can be smoothly closed.

In the outer faces of the first and second shells 25, 26, shutter sliding faces 25b, 26b which are inward offset by a depth that is equal to or larger than the thickness of the light-shielding plate 12 are formed inside the light-shielding plate attaching faces 25a, 26a, and the shutter 13 is attached to the shutter sliding faces 25b, 26b. According to the configuration, the shutter 13 can be smoothly moved between the cartridge body 11 and the light-shielding plate 12, and hence production of shavings and the like due to movement can be suppressed. In order to diffuse incident light, the shutter sliding faces 25b, 26b may be configured as rough faces. Similarly, the inner face of the light-shielding plate 12, and the inner and outer faces of the shutter 13 may be configured as rough faces.

In order to allow the front face 56g in the loading direction of the cartridge 2 to be exposed from the tip end face in the loading direction of the cartridge body 11, the slide member 56 is slidably incorporated between the first and second shells 25, 26. A mounting face 56a which is to be attached to the inner face of the connecting portion 55c of the shutter member 55 is disposed on an end portion of the front face 56g of the slide member 56. For example, two pins 56b are integrally formed on the mounting face 56a. The pins are inserted into two holes 55d disposed in the connecting portion 55c, and the tip ends of the pins are collapsed by heat, whereby the shutter member 55 and the slide member 56 are fixed to each other. Alternatively, this fixation may be conducted by using an adhesive agent, a double-sided adhesive tape, or the like. In the case where the shutter member 55 is formed by a plastic, any one of various kinds of welding processes may be employed. Alternatively, screwing may be used.

Figure 8:
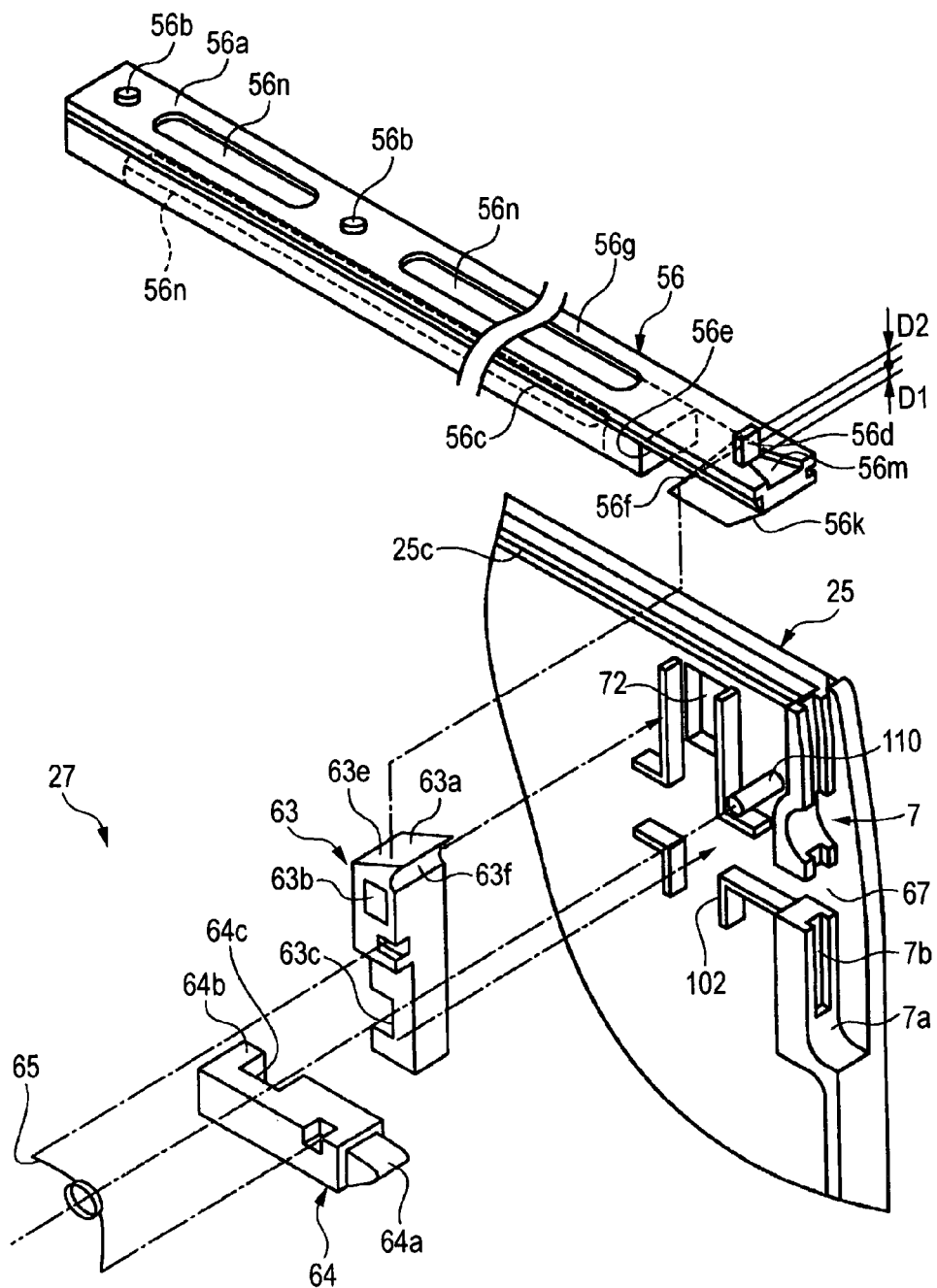
FIG. 8 is an exploded perspective view showing the configuration of a locking mechanism.

As shown in FIGS. 4B and 8, grooves 56c extending in the longitudinal direction are formed in the side faces of the slide member 56. Ridges 25c, 26c which are disposed on the inner faces of the first and second shells 25, 26 on the tip end side in the loading direction are inserted into the grooves 56c, respectively. The combination of the grooves 56c and the ridges 25c, 26c enables the slide member 56 to be slidingly moved without being detached from the cartridge body 11.

An engaging groove 56m that has a depth of D1, and that is formed into a substantially truncated V-shape in which the width is narrower as more advancing from the end face toward the middle is disposed in an end portion of the front face 56g of the slide member 56 in the shutter closing direction. In the inner side of the engaging groove 56m, an engaging portion 56d which is to be operated when the shutter 13 is opened is formed while being protruded by a height D2 from the front face 56g of the slide member 56 in the forward of the inserting direction of the cartridge 2. Groove-like lightening portions 56n are disposed in the upper and lower faces of the slide member 56. Therefore, the slide member 56 can be formed to be thick, and the substantial height (D1+D2) of the engaging portion 56d which is engaged with a shutter opening/closing roller 43 that will be described later can be ensured to have a height which is required for sure engagement, without largely protruding the height D2 of the engaging portion 56d from the front face 56g of the slide member 56.

The engaging portion 56d is disposed with respect to the shutter member 55 so that the slide member 56 is extended in the closing direction of the shutter, and hence exposed to the outside without hiding behind the third plate portion 12c of the light-shielding plate 12. The cutaway 40 of the third plate portion 12c of the light-shielding plate 12 is disposed in order to avoid interference with the engaging portion 56d when the shutter 13 is moved to the opening position. When the cutaway is formed in the case where the moving distance of the shutter 13 is insufficient and the internal openings 18, 19 cannot be opened, it is possible to increase the moving distance.

From the viewpoint of the light shielding property, it is preferable that the cutaway 40 is not disposed. Even when the cutaway 40 is disposed, consideration is required for separating an edge 40a of the cutaway 40 from the peripheral edge portions 18a, 19a of the internal openings 18, 19 in the shutter closing direction as far as possible, so as not to impede the light shielding property.

Figure 9:
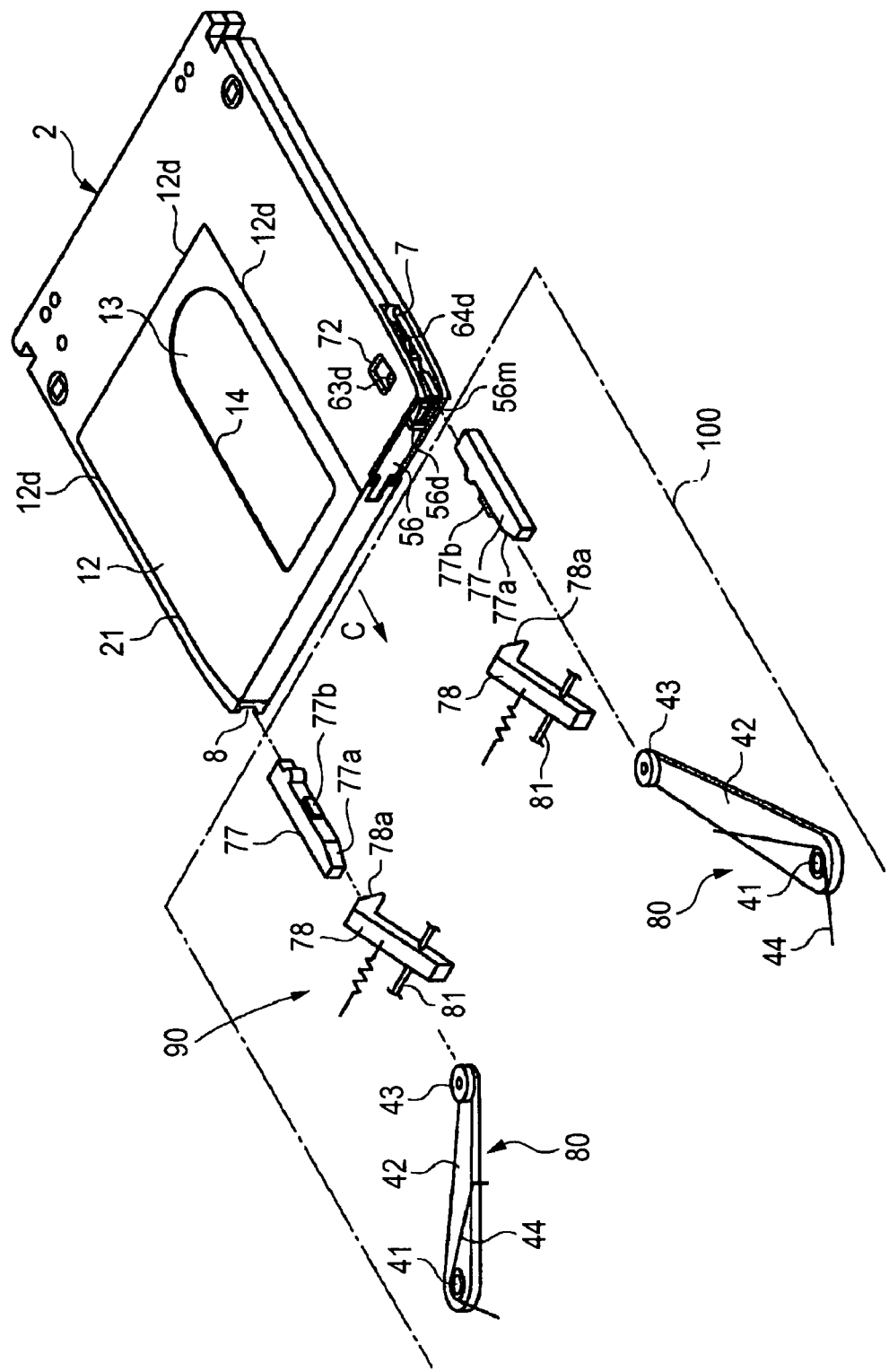
FIG. 9 is an exploded perspective view showing an example of a shutter lock canceling mechanism for opening the shutter.
Figure 10:
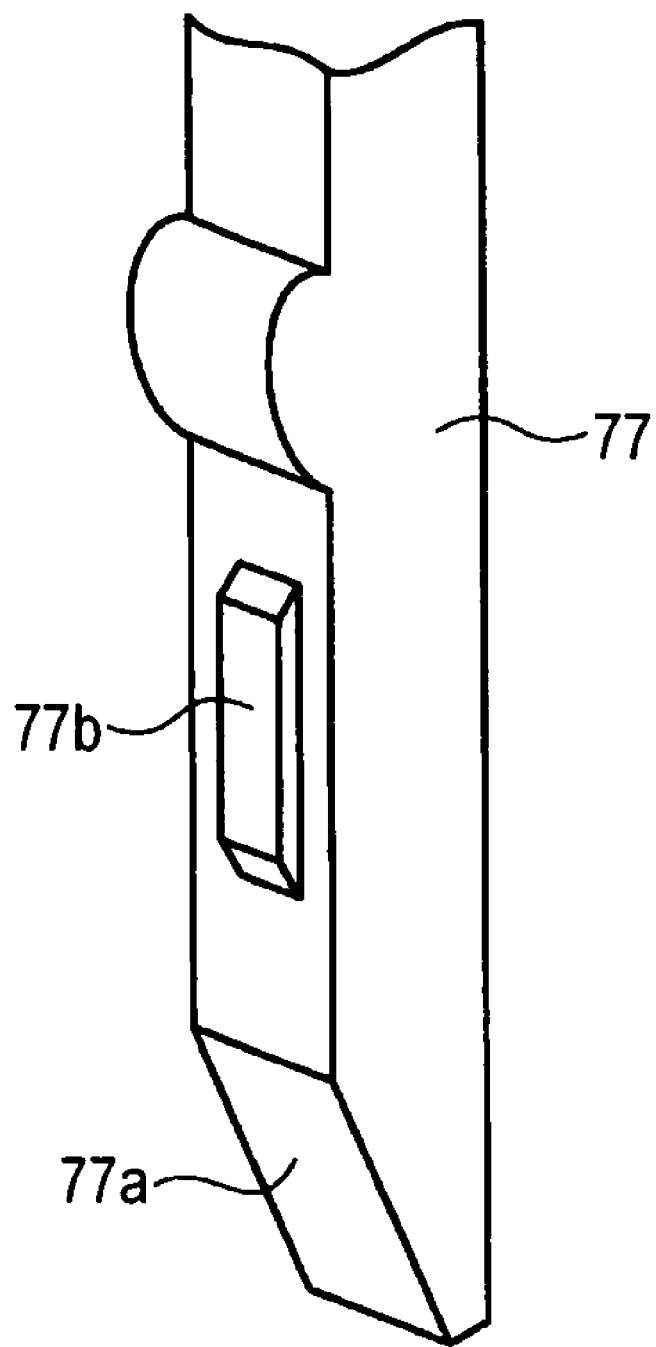
FIG. 10 is a perspective view enlargedly showing main portions of a shutter opening member.
Figure 12:
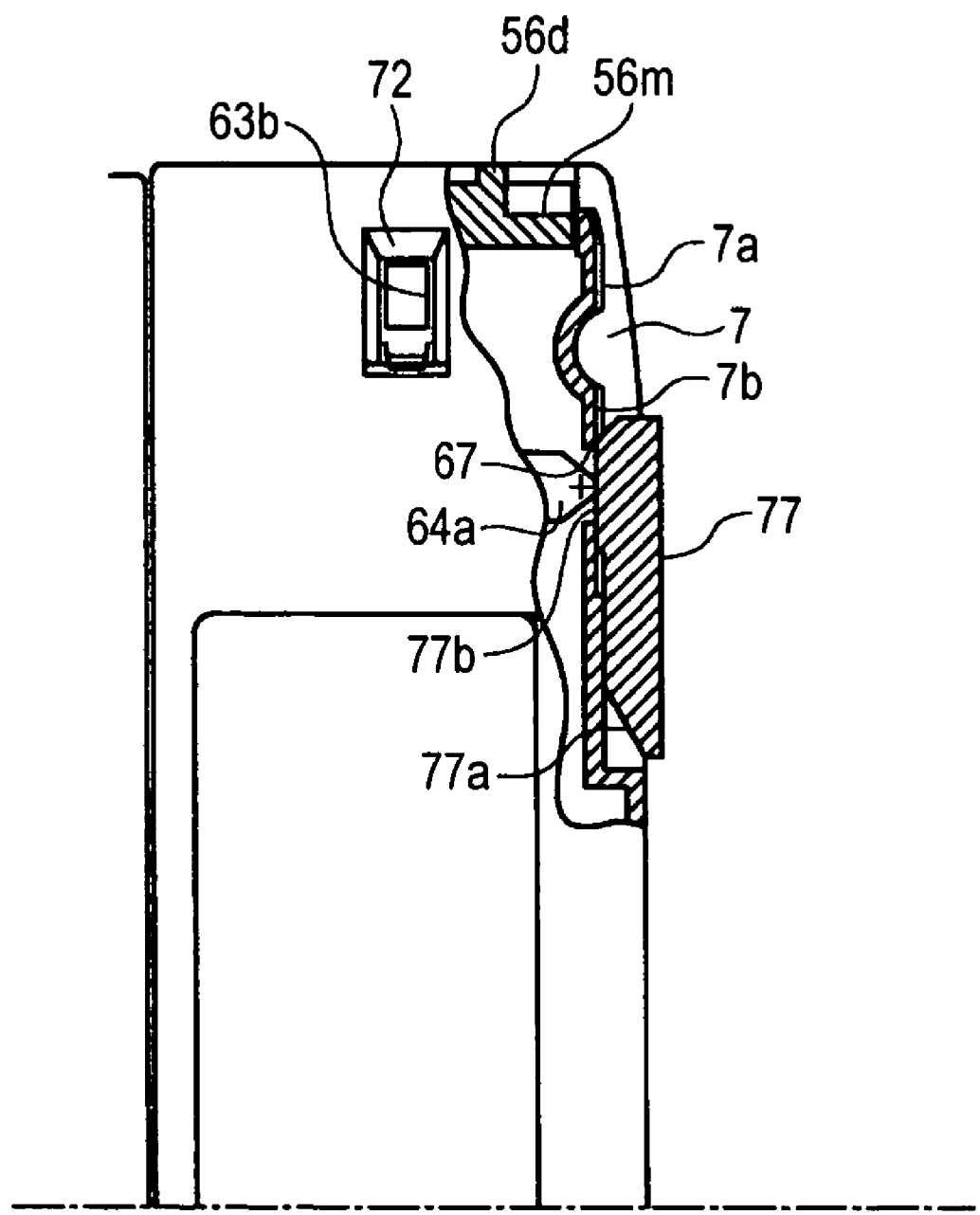
FIG. 12 is a partially cutaway view showing positional relationships between the locking mechanism and the shutter opening member.
Figure 13:
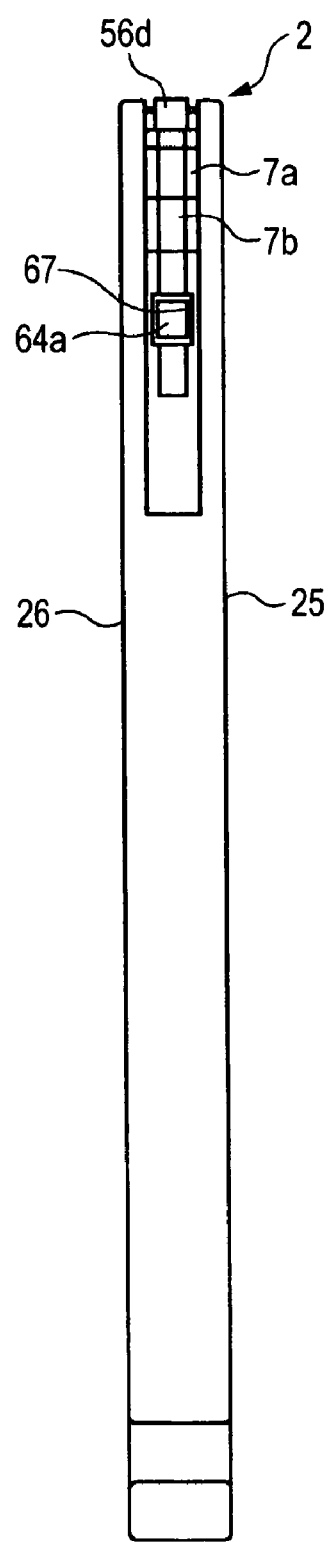
FIG. 13 is a right side view of the cartridge.

Next, the locking mechanism and a shutter lock canceling mechanism will be described with reference to FIGS. 8 to 13. FIG. 8 is an exploded perspective view showing the configuration of the locking mechanism, FIG. 9 is an exploded perspective view showing an example of the shutter lock canceling mechanism for opening the shutter, FIG. 10 is a perspective view enlargedly showing main portions of a shutter opening member, FIG. 11 is a view illustrating the operation of the locking mechanism, FIG. 12 is a partially cutaway view showing positional relationships between the locking mechanism and the shutter opening member (only main portions are shown), and FIG. 13 is a right side view of the cartridge.

As shown in FIG. 8, in the slide member 56, a recess 56e is formed adjacent to the engaging portion 56d. In the right side face in the figure of the recess 56e, an engagement inclined face (engagement portion) 56f which is further inclined in the shutter closing direction as more advancing toward the front side in the loading direction of the cartridge is formed. A guide inclined face 56k which is chamfered in substantially parallel to the engagement inclined face 56f is formed in an edge portion between the right end face in the figure of the slide member 56 and the lower face.

The locking mechanism 27 is configured by: the locking member 63 which is to lock the shutter at the closing position; the lock canceling member 64 which locks the movement of the locking member 63; and a lock spring 65 which urges the locking member 63 in the upward direction in the figure, and also urges the lock canceling member 64 in the rightward direction in the figure.

The locking member 63 is incorporated in a slide frame 102 disposed in the first shell 25 so to be slidable in the longitudinal direction. The locking member 63 includes: a locking piece 63a which is formed at the tip end, and which is engaged with the recess 56e of the slide member 56 to lock the shutter 13; a rectangular operation hole 63b which is exposed to the outside through the opening 72; and a fitting groove 63c which is formed on the side face of the locking member 63, and which is engaged with the lock canceling member 64.

The lock canceling member 64 is incorporated in the slide frame 102 so as to be overlaid on the locking member 63, and laterally slidable. In the lock canceling member 64, an operating portion 64a which is a tip end portion is formed into a substantially triangular shape, and disposed while being protruded from a cutaway 67 of the positioning groove 7 into the positioning groove 7 (see also FIG. 13). The positioning groove 7 is configured by a shallow groove 7a which is formed from the front side in the loading direction of the cartridge 2 toward the rear side, and a deep groove 7b which is formed deeper in the shallow groove 7a and to a rear side of the cutaway 67. In the lock canceling member 64, a restriction protrusion 64b which is formed at the rear end, and a groove 64c are disposed. The locking member 63 is fitted into the groove 64c, and disposed so as to be vertically movable.

In the upper face of the locking piece 63a of the locking member 63, a slope 63e which induces the engagement with the recess 56e when the shutter is moved from the opening position to the closing position is formed in substantially parallel to the engagement inclined face 56f of the slide member 56. A hook portion 63f which is an inclination face that is substantially parallel to the engagement inclined face 56f of the recess 56e is formed on the right side in the figure of the locking piece 63a. When the slide member 56 is moved in the leftward direction in the figure (the direction in which the shutter is opened), the engagement inclined face 56f is engaged with the hook portion 63f to surely block the movement. The locking member 63 and the lock canceling member 64 are urged respectively upward and rightward by the lock spring 65 inserted onto a pin 110.

As shown in FIG. 9, for example, a shutter lock canceling mechanism 90 is incorporated in a hologram recording apparatus (recording and reproducing apparatus) 100 into which the cartridge 2 is to be loaded. The mechanism has: a pair of positioning members 77, 77; a pair of lock canceling arms 78, 78 which are lock canceling members for operating the locking member 63 to release the shutter 13; and a pair of shutter opening mechanisms 80 which cause the shutter 13 to slide between the opening and closing positions. The pair of positioning members 77, 77 are to be engaged with the positioning grooves 7, 8 in the both side faces of the loaded cartridge 2 to position the cartridge 2 in the insertion direction of the cartridge 2 and a direction perpendicular to the insertion direction.

As shown in FIG. 10, the positioning members 77 are rectangular bar-like members having the same width as the positioning grooves 7, 8. Inclined faces 77a are formed in the tip ends of the members. Ridges 77b which are to be fitted to the deep grooves 7b, 8b of the positioning grooves 7, 8 are formed in the portions which correspond to the cutaway 67 when the cartridge 2 is loaded into the hologram recording apparatus 100.

The lock canceling arms 78, 78 are substantially L-like members which are disposed so as to be swingable about shafts 81 fitted into one-end portions of the arms. Inclined faces 78a are formed in protruding portions (portions to be engaged with the rectangular operation hole 63b) of the tip ends. When one of the lock canceling arms 78 swings and the protruding portion at the tip end is inserted into the rectangular operation hole 63b of the locking member 63 through the opening 72 of the cartridge 2, the inclined face 78a pushes the rear face in the cartridge inserting direction of the rectangular operation hole 63b to move the locking member 63 in the direction (the downward direction in FIG. 8) opposite to the loading direction.

Since recording can be performed on the both faces of the recording disk 4, the cartridge 2 is set into the apparatus while either of the A-face 2a or the B-face 2b is upward directed. When the loaded face is changed, the position of the locking mechanism 27 is laterally inverted. Therefore, the shutter lock canceling mechanism 90 includes the lock canceling arm 78 for inverted loading so that, even when the cartridge 2 is invertedly loaded, the arm can be engaged with the rectangular operation hole 63b.

The shutter opening mechanism 80 includes a shutter arm 42 which is disposed so as to be swingable about a support pin 41 that is placed outside the side wall of the loaded cartridge 2. The shutter opening/closing roller 43 which is a shutter opening member is rotatably disposed at the tip end of the shutter arm 42. The shutter arm is urged by a coil spring 44 in the direction in which the shutter opening/closing roller 43 butts against the engaging groove 56m. The other shutter opening mechanism 80 is disposed at the symmetric position on the opposite side in order to cope with the inverted insertion of the cartridge 2.

As shown in FIG. 11A, when the cartridge is not used, the operating portion 64a of the lock canceling member 64 is protruded by the urging of the lock spring 65 into the positioning groove 7 through the cutaway 67. At this time, the restriction protrusion 64b of the lock canceling member 64 is engaged with the fitting groove 63c of the locking member 63 to block a downward sliding operation of the locking member 63.

As shown in FIGS. 11B and 12, when the cartridge 2 is loaded into the hologram recording apparatus 100, a first operation in which the operating portion 64a is pushed by the inclined face 77a of the positioning member 77 inserted in the positioning groove 7, and the lock canceling member 64 is pressingly inserted into the cartridge is first performed. As a result, usually, the restriction protrusion 64b escapes from the fitting groove 63c, and the locking member 63 is enabled to downward slide.

When the cartridge 2 is further inserted into the hologram recording apparatus 100, a second operation in which the ridge 77b of the positioning member 77 that is fitted into the deep groove 7b further pressingly inserts the operating portion 64a into the cartridge is performed. As a result, in the case where the engagement between the restriction protrusion 64b and the fitting groove 63c is not cancelled by the first operation because of influences of component tolerances and the like, the restriction protrusion 64b is allowed to surely escape from the fitting groove 63c, and the locking member 63 is enabled to downward slide. At the same time, the shutter opening/closing roller 43 is placed at the position corresponding to the engaging groove 56m.

As shown in FIG. 11C, when the lock canceling arm 78 disposed in the apparatus enters the opening 72 or 73 and is then inserted into the rectangular operation hole 63b of the locking member 63, the locking member 63 is pushed by the inclined face 78a of the lock canceling arm 78 to downward slide. Therefore, the locking piece 63a escapes from the recess 56e of the slide member 56, and hence the shutter can move. At the same time, the shutter opening/closing roller 43 is fitted into the engaging groove 56m.

When the cartridge 2 is further inserted, the shutter arm 42 is pushed by the cartridge 2 to swing in a clockwise direction against the elastic force of the coil spring 44. At this time, the shutter opening/closing roller 43 is guided by the engaging groove 56m into which the roller is fitted, to be relatively moved in the leftward direction in the figure (toward the middle of the cartridge 2) while the position in the direction perpendicular to the plane of FIG. 11 is restricted, and pushes the engaging portion 56d, thereby opening the shutter 13.

At this time, the substantial height (engagement height) of the engaging portion 56d which is engaged with the shutter opening/closing roller 43 is a total (D1+D2) of the depth D1 of the engaging groove 56m and the protrusion height D2 of the engaging portion 56d from the upper face of the slide member 56. Therefore, the engagement height of the engaging portion 56d can be increased without increasing the protrusion height D2 from the cartridge 2, and the engaging portion 56d is surely engaged with the shutter opening/closing roller 43.

The width of the engaging groove 56m is formed so that the groove has a substantially truncated V-shape in which the width is narrower as more advancing toward the middle of the cartridge 2. Even when the position of the shutter opening/closing roller 43 is slightly deviated in the thickness direction of the cartridge 2, therefore, the roller can be easily fitted into the engaging groove 56m. In accordance with the movement of the shutter opening/closing roller 43 toward the engaging portion 56d, the roller is moved while the position in the thickness direction is corrected by the engaging groove having the truncated V-like shape. Therefore, the roller surely butts against the engaging portion 56d, and opens the shutter 13.

In the locking mechanism 27 in the embodiment, the shapes of the engagement inclined face 56f and hook portion 63f are inclined in the direction in which, when the slide member 56 is moved in the opening direction of the shutter 13, they interlock and are firmly engaged with each other with a further enhanced engagement force. Therefore, the shutter 13 is surely prevented from being opened. The cancellation of the locking of the shutter 13 requires the two-step operation, and hence it is possible to prevent the shutter 13 from being accidentally opened.

As described above, the photosensitive-recording medium cartridge 2 of the invention includes the locking mechanism 27 that, when the locking of the shutter 13 is to be cancelled, requires the two-step operation of the first operation of setting the locking mechanism 27 to the cancellation-enabled state, and the second operation of canceling the locking of the shutter 13. In the shutter lock canceling mechanism 90 of the recording and reproducing apparatus 100, the first operation is automatically performed by loading the photosensitive-recording medium cartridge 2 into the recording and reproducing apparatus 100, so that it is possible to set a state where cancellation of engagement of the locking mechanism can be surely performed.

In the above, the description has been made while taking the cartridge housing a recording disk in which recording can be performed on the both faces, as an example. Alternatively, the cartridge may house a recording disk in which recording is performed on only one face. In the alternative, the opening is formed in only one face, and the shutter opens and closes the opening. Furthermore, the description has been made while taking the cartridge housing a hologram recording medium as an example. The invention can be applied also to a cartridge housing a recording medium having another photosensitivity.

The present application claims foreign priority based on Japanese Patent Application (JP 2006-050673) filed Feb. 27 of 2006, the contents of which is incorporated herein by reference.

What is claimed is:

1. A photosensitive-recording medium cartridge comprising:
    a photosensitive recording medium;
    a cartridge body including:
    a disk housing portion which rotatably stores the photosensitive recording medium;
    an internal opening through which a center and recording face of the photosensitive recording medium are exposed to an outside; and
    a shutter sliding face which is formed on an outer face while being inwardly offset;
    a shutter which is movable between a closing position where the internal opening is closed, and an opening position where the internal opening is opened, and which is disposed on the shutter sliding face; and
    a locking mechanism having a locking member which is to be engaged with the shutter to lock the shutter at the closing position,
    wherein
    the cartridge body comprises a positioning groove including:
        a shallow groove formed in a side face thereof in the opposite direction of a loading direction of the photosensitive-recording medium cartridge; and
        a deep groove which is formed deeper in the shallow groove,
    the locking mechanism comprises a lock canceling member having an operating portion which protrudes from the positioning groove, and pushes the operating portion into the cartridge body to allow cancellation of engagement between the locking member and the shutter,
    the shutter comprises a slide member including a recess, and
    the locking member has a locking piece at one end thereof, the locking member being engaged with the recess, and each of the shutter and locking member having a shape inclined in an opposite direction of a opening direction of the shutter.

2. A recording and reproducing apparatus which records data on a photosensitive recording medium, or reproduces recorded data from the photosensitive recording medium, said recording and reproducing apparatus comprising:
    a shutter lock canceling mechanism,
    a photosensitive-recording medium cartridge comprising:
    the photosensitive recording medium;
    a cartridge body including:
    a disk housing portion which rotatably stores the photosensitive recording medium;
    an internal opening through which a center and recording face of the photosensitive recording medium are exposed to an outside; and
    a shutter sliding face which is formed on an outer face while being inwardly offset;
    a shutter which is movable between a closing position where the internal opening is closed, and an opening position where the internal opening is opened, and which is disposed on the shutter sliding face; and
    a locking mechanism having a locking member which is to be engaged with the shutter to lock the shutter at the closing position,
    wherein
    the cartridge body comprises a positioning groove including:
        a shallow groove formed in a side face thereof in the opposite direction of a loading direction of the photosensitive-recording medium cartridge; and
        a deep groove which is formed deeper in the shallow groove,
    the locking mechanism comprises a lock canceling member having an operating portion which protrudes from the positioning groove, and pushes the operating portion into the cartridge body to allow cancellation of engagement between the locking member and the shutter,
    the shutter lock canceling mechanism comprises a positioning member which includes a ridge and which is to be fitted into the positioning groove, the ridge being fitted into the deep groove to push the operating portion into the cartridge body when the photosensitive recording medium is loaded into the recording and reproducing apparatus.

3. The shutter lock canceling mechanism as claimed in claim 2, which comprises a shutter opening mechanism including a shutter opening member,
    wherein
    the photosensitive-recording medium cartridge comprises a slide member including a engaging groove having width, which narrows in a direction perpendicular to a width direction thereof, and
    the shutter opening member engages the engaging groove.

* * * * *